US012466093B2

(12) United States Patent
Jiang

(10) Patent No.: US 12,466,093 B2
(45) Date of Patent: Nov. 11, 2025

(54) ELECTRIC HAIR CLIPPER

(71) Applicant: Xiaoyan Jiang, Ruian (CN)

(72) Inventor: Xiaoyan Jiang, Ruian (CN)

( * ) Notice: Subject to any disclaimer, the term of this patent is extended or adjusted under 35 U.S.C. 154(b) by 0 days.

(21) Appl. No.: 19/273,489

(22) Filed: Jul. 18, 2025

(65) Prior Publication Data

US 2025/0339981 A1 Nov. 6, 2025

(30) Foreign Application Priority Data

Nov. 1, 2024 (CN) ......................... 202422659060.6

(51) Int. Cl.
*B26B 19/38* (2006.01)
*B26B 19/28* (2006.01)

(52) U.S. Cl.
CPC .......... *B26B 19/3853* (2013.01); *B26B 19/28* (2013.01)

(58) Field of Classification Search
None
See application file for complete search history.

(56) References Cited

U.S. PATENT DOCUMENTS 10,737,402 B2 * 8/2020 Wang ...................... F16H 25/20
2015/0040405 A1 2/2015 Kulshreshtha
2016/0176060 A1 6/2016 Kulshreshtha
2021/0008738 A1 1/2021 Sterzi

FOREIGN PATENT DOCUMENTS

CN 110480688 A * 11/2019 ............. B26B 19/14
CN 112157679 A * 1/2021 ............. B26B 19/44
CN 213165486 U * 5/2021
DE 4217667 A1 * 12/1992 ............. B26B 19/20

OTHER PUBLICATIONS

English translation of CN-213165486-U, dated May 11, 2021.*
English translation of CN-110480688-A, dated Nov. 22, 2019.*
English translation of DE-4217667-A1, dated Dec. 3, 1992.*
English translation of CN-112157679-A, dated Jan. 1, 2021.*

* cited by examiner

*Primary Examiner* — Hwei-Siu C Payer
(74) *Attorney, Agent, or Firm* — Hemisphere Law, PLLC; Zhigang Ma

(57) ABSTRACT

An electric hair clipper is provided, which relates to the technical field of haircutting equipment. The electric hair clipper includes a cutting assembly, a driving assembly, and a fixing member and a sliding member that are convenient for mounting and removing a bin cover. The cutting assembly includes a bracket and a movable blade holder. The movable blade holder is movably arranged on the bracket. According to the electric hair clipper, when the driving motor works, hairs are pressed between the fixed blade and the movable blade and are clipped through cooperation between the movable blade and the fixed blade, so that the clipping effect is good. Cut hairs are stored in a hair storage bin. The electric hair clipper is easy to operate and convenient to use.

14 Claims, 13 Drawing Sheets

ELECTRIC HAIR CLIPPER

TECHNICAL FIELD

The present disclosure relates to the technical field of haircutting equipment, and in particular to, an electric hair clipper.

BACKGROUND

Hairs may have split ends when the hairs grow to a particular length. If the hairs are not cut in time, both the hairstyle and the health of the hairs will be affected. At present, the split ends of the hairs are mostly cut by a professional barber at a hair salon. When cutting hairs, the barber sorts the split ends of the hairs with one hand and cuts the split ends with hair scissors held in the other hand. This is troublesome and time-consuming, and may not completely cut off the split ends. Therefore, how to provide an electric hair clipper that is convenient to use and has a good clipping effect is a problem urgently needing to be solved by a person skilled in the art.

SUMMARY

The present disclosure aims to provide an electric hair clipper, and solves the technical problems that current hair clipping equipment is inconvenient to use and has a poor clipping effect.

In order to achieve the above objective, the present disclosure provides an electric hair clipper, including a cutting assembly and a driving assembly. The cutting assembly includes a bracket and a movable blade holder. The movable blade holder is movably arranged on the bracket. The bracket is fixedly provided with a fixed blade. The movable blade holder is fixedly provided with a movable blade.

The driving assembly includes a driving motor, a transmission member, and a pressure lever. The driving motor is in transmission connection to the transmission member. The transmission member is fixedly provided with a first eccentric part and a second eccentric part. The pressure lever is movably arranged on the bracket.

When the driving motor drives the transmission member to rotate, the first eccentric part drives the pressure lever to do linear reciprocating motion to press hairs between the fixed blade and the movable blade. The second eccentric part drives the movable blade holder to do linear reciprocating motion to drive the movable blade to move for clipping.

Preferably, the transmission member is a gear; the second eccentric part is fixedly arranged on the transmission member; the first eccentric part is fixedly arranged on the second eccentric part; and the first eccentric part is located on one side of the second eccentric part facing away from the transmission member.

Preferably, a first limiting slot is provided in one end of the pressure lever; the first eccentric part is accommodated in the first limiting slot; the first eccentric part is connected to the pressure lever through the first limiting slot; and another end of the pressure lever is slidably connected to the bracket.

Preferably, the movable blade holder is provided with a second limiting slot; the second eccentric part is accommodated in the second limiting slot; and the second eccentric part is connected to the movable blade holder through the second limiting slot.

Preferably, the movable blade holder is provided with a first limiting boss; the movable blade is provided with a first clamping slot; and the first limiting boss is clamped with the first clamping slot.

Preferably, the bracket is provided with a second limiting boss; the fixed blade is provided with a second clamping slot; and the second limiting boss is clamped with the second clamping slot.

Preferably, the first limiting boss is provided with an accommodating slot; and the second limiting boss is accommodated inside the accommodating slot, so that the movable blade holder does the linear reciprocating motion.

Preferably, the pressure lever is provided with a threaded part; and the threaded part is located in a middle part of the pressure lever.

Preferably, torsion springs are arranged on two sides of the movable blade; the torsion springs are arranged on the bracket; and two ends of the torsion springs are connected to the movable blade.

Preferably, the pressure lever is arranged on the bracket through a limiting plate; the limiting plate is configured to limit movement of the pressure lever in a direction perpendicular to a reciprocating motion direction of the pressure lever; and the limiting plate is fixedly arranged on the bracket through a fastener.

Preferably, the driving assembly further includes:

- a power source, configured to supply electrical energy to the driving motor; and
- a first gear, connected to an output shaft of the driving motor and is meshed with the transmission member.

Preferably, the electric hair clipper further includes:

- an upper shell and an upper cover plate, where the upper shell and the upper cover plate are connected; the upper shell and the upper cover plate form an upper accommodating cavity; the cutting assembly and the driving assembly are arranged in the upper accommodating cavity; and
- a lower shell and a lower cover plate, where the lower shell and the lower cover plate are connected; the lower shell and the lower cover plate form a hair storage bin; the hair storage bin is configured to store fallen hairs cut off by the fixed blade and the movable blade;
- the upper shell and the lower shell are rotatably connected; and an elastic member is arranged between the upper shell and the lower shell.

Preferably, the electric hair clipper further includes a circuit board and a battery level display; the circuit board and the battery level display are located in the upper accommodating cavity formed by the upper shell and the upper cover plate; and the circuit board is electrically connected to the power source and the battery level display.

Preferably, the electric hair clipper further includes the lower cover plate is further provided with a bin cover, a sliding member, and a fixing member; the lower cover plate is provided with a limiting sliding chute; the fixing member is fixedly arranged on the lower cover plate; the sliding member is movably arranged on the limiting sliding chute; one end of the sliding member is connected to the lower cover plate through a spring; one side of the bin cover is used for being in clamping connection with the lower cover plate; and another side of the bin cover is used for pressing against one end of the sliding member facing away from the spring.

Compared with the above background section, the electric hair clipper provided in the present disclosure has the advantages that the first eccentric part and the second eccentric part are eccentrically arranged relative to the transmission member. As the driving motor drives the transmission member to rotate, the first eccentric part drives the pressure lever to do the linear reciprocating motion. Meanwhile, the second eccentric part drives the movable blade holder to do the linear reciprocating motion, and the pressure lever does the linear reciprocating motion to press the hairs between the fixed blade and the movable blade. The movable blade holder drives the movable blade to do the linear reciprocating motion. The movable blade and the fixed blade cooperate to clip the hairs, thereby cutting off split ends of the hairs. When the driving motor operates to press the hairs between the fixed blade and the movable blade, the movable blade and the fixed blade cooperate to clip the hairs, so that the electric hair clipper is convenient to use and has a good clipping effect.

BRIEF DESCRIPTION OF THE DRAWINGS

In order to describe the technical solutions in the embodiments of the present disclosure or in the related art more clearly, the following briefly introduces the accompanying drawings for describing the embodiments or the related art. Apparently, the accompanying drawings in the following description show merely the embodiments of the present disclosure, and a person of ordinary skill in the art may still derive other drawings from the provided accompanying drawings without creative efforts.

Figure 1:
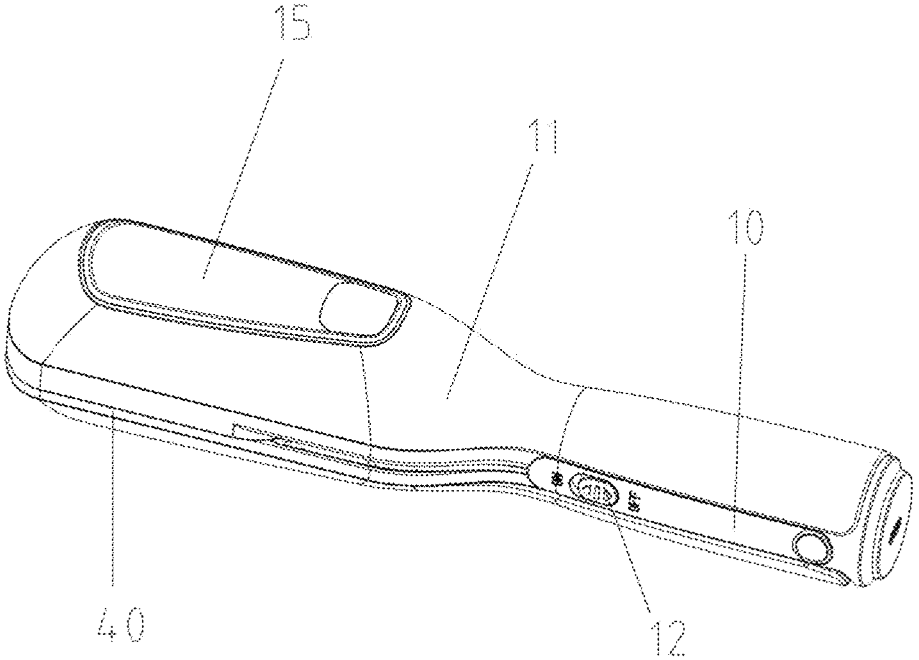
FIG. 1 is a schematic structural diagram of an electric hair clipper according to an embodiment of the present disclosure.

Numerals in FIG. 1 to FIG. 13: 10: upper shell; 11: upper cover plate; 12: switch; 13: circuit board; 14: battery level display; 15: battery level cover plate; 20: bracket; 201: second limiting boss; 21: fixed blade; 211: second clamping slot; 22: movable blade holder; 221: second limiting slot; 222: first limiting boss; 2221: accommodating slot; 23: movable blade; 231: first clamping slot; 24: torsion spring; 30: driving motor; 31: first gar; 32: transmission member; 321: first eccentric part; 322: second eccentric part; 33: pressure lever; 331: first limiting slot; 332: threaded part; 34: limiting plate; 35: power source; 40: lower shell; 41: lower cover plate 411: limiting sliding chute; 42: hair storage bin; 43: bin cover; 44: sliding member; 45: fixing member; 46: elastic contact point; 50: elastic member; 51: locking push button; and 60: negative-ion generator.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all the embodiments. Based on the embodiments of the present disclosure, all other embodiments obtained by those of ordinary skill in the art without creative efforts fall within the protection scope of the present disclosure.

In order to make a person skilled in the art better understand the solutions of the present disclosure, the present disclosure will be further explained in detail below with reference to the accompanying drawings and specific implementations.

The core objective of the present disclosure provides an electric hair clipper. With reference to FIG. 1 to FIG. 6 together, the electric hair clipper provided in the present disclosure includes a cutting assembly and a driving assembly. The cutting assembly includes a bracket 20 and a movable blade holder 22. The movable blade holder 22 is movably arranged on the bracket 20. The bracket 20 is fixedly provided with a fixed blade 21. The movable blade holder 22 is fixedly provided with a movable blade 23. The driving assembly includes a driving motor 30, a transmission member 32, and a pressure lever 33. The driving motor 30 is in transmission connection to the transmission member 32. The transmission member 32 is fixedly provided with a first eccentric part 321 and a second eccentric part 322. The pressure lever 33 is movably arranged on the bracket 20. When the driving motor 30 drives the transmission member 32 to rotate, the first eccentric part 321 drives the pressure lever 33 to do linear reciprocating motion to press hairs between the fixed blade 21 and the movable blade 23. The second eccentric part 322 drives the movable blade holder 22 to do linear reciprocating motion to drive the movable blade 23 to move for clipping.

The first eccentric part 321 and the second eccentric part 322 are eccentrically arranged relative to the transmission member 32. As the driving motor 30 drives the transmission member 32 to rotate, the first eccentric part 321 drives the pressure lever 33 to do the linear reciprocating motion. Meanwhile, the second eccentric part 322 drives the movable blade holder 22 to do the linear reciprocating motion. As the pressure lever 33 does the linear reciprocating motion, the pressure lever 33 presses the hairs between the fixed blade 21 and the movable blade 23. As the movable blade holder 22 does the linear reciprocating motion, the movable blade holder 22 drives the movable blade 23 to do the linear reciprocating motion. The movable blade 23 and the fixed blade 21 cooperate to clip the hairs, thereby cutting off split ends of the hairs. In this way, when the driving motor 30 operates to press the hairs between the fixed blade 21 and the movable blade 23, the movable blade 23 and the fixed blade 21 cooperate to clip the hairs, so that the electric hair clipper is convenient to use and has a good clipping effect.

Figure 5:
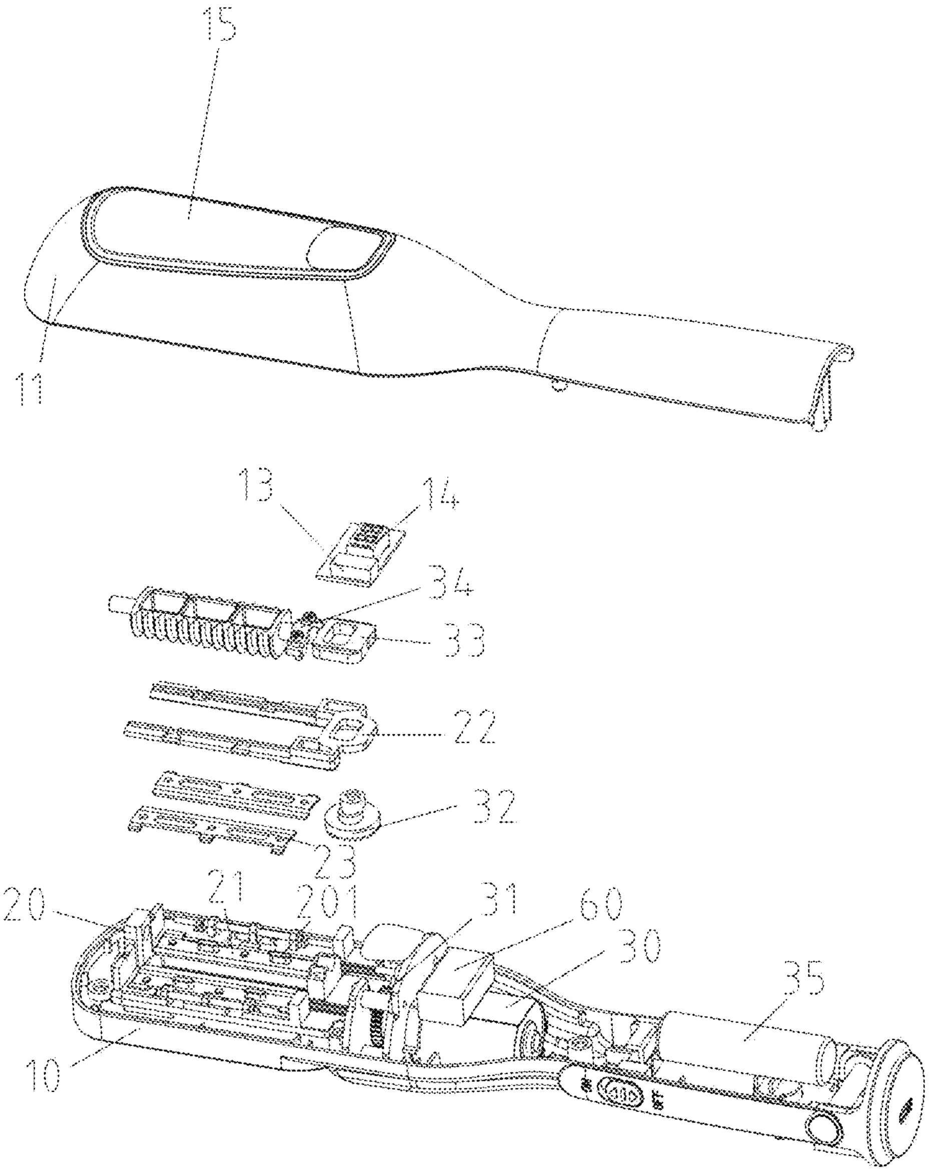
FIG. 5 is a schematic exploded view II of the electric hair clipper shown in FIG. 1.
Figure 6:
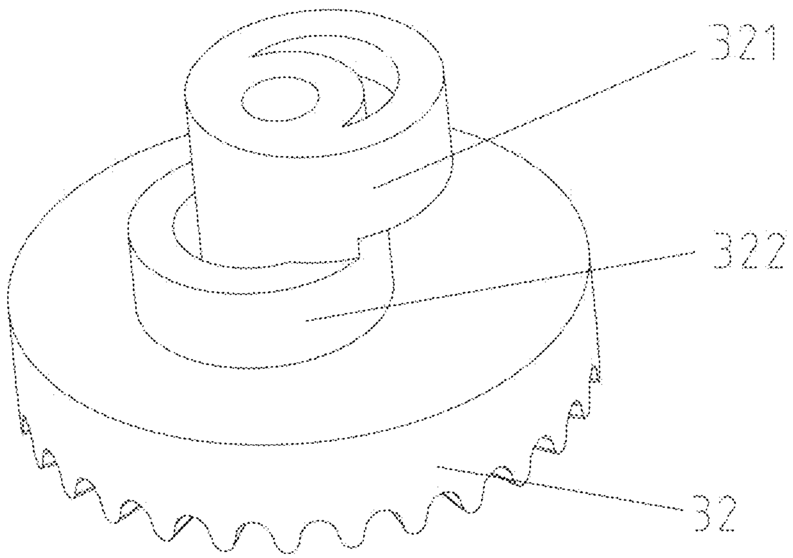
FIG. 6 is a schematic structural diagram of a transmission member in an electric hair clipper.

Specifically, referring to FIG. 5 to FIG. 6, in this implementation, the transmission member 32 is a gear. The second eccentric part 322 is fixedly arranged on the transmission member 32. The first eccentric part 321 is fixedly arranged on the second eccentric part 322. The first eccentric part 321 is located on one side of the second eccentric part 322 facing away from the transmission member 32.

During operation, the driving motor 30 drives the transmission member 32 to rotate. As the transmission member 32 rotates, the first eccentric part 321 drives the pressure lever 33 to do the linear reciprocating motion, and the second eccentric part 322 drives the movable blade holder 22 to do the linear reciprocating motion. The pressure lever 33 and the movable blade holder 22 can do the linear reciprocating motion at the same time. The pressure lever 33 and the movable blade holder 22 simultaneously move, and the motions of the pressure lever 33 and the movable blade holder 22 do not interfere with each other.

Figure 4:
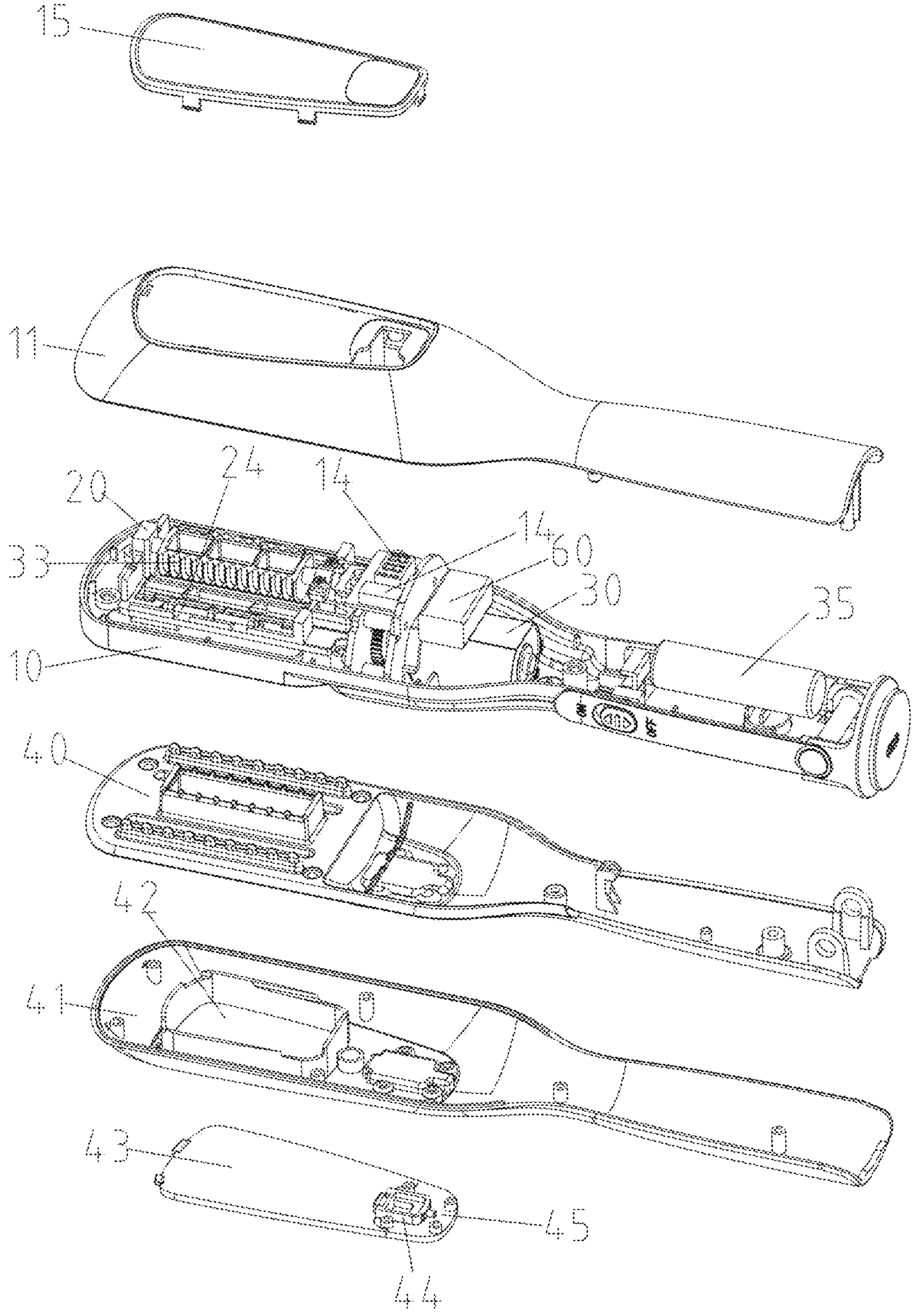
FIG. 4 is a schematic exploded view I of the electric hair clipper shown in FIG. 1.
Figure 7:
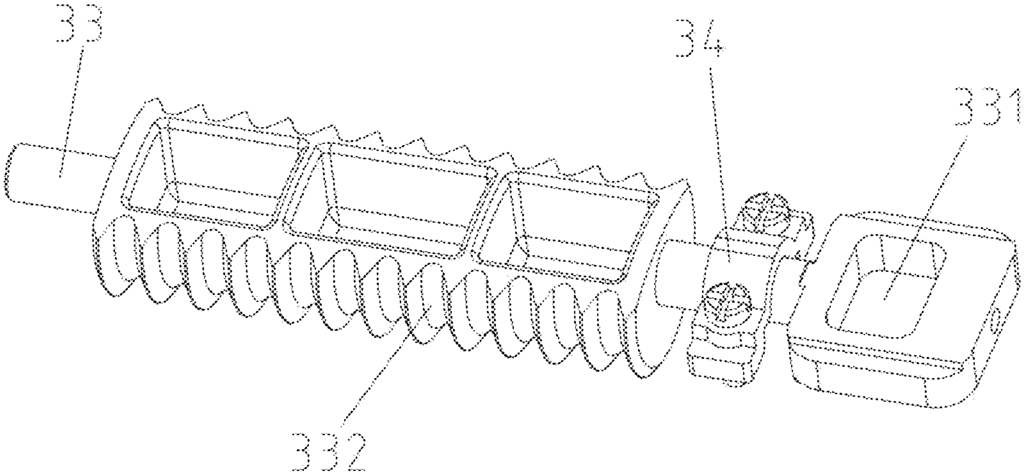
FIG. 7 is a schematic structural diagram of a pressure lever in an electric hair clipper.
Figure 8:
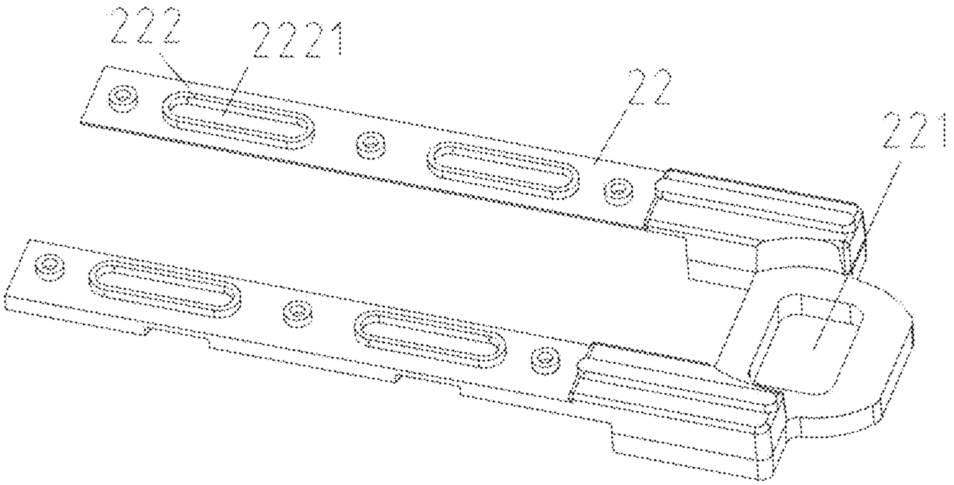
FIG. 8 is a schematic structural diagram of a movable blade holder in an electric hair clipper.
Figure 9:
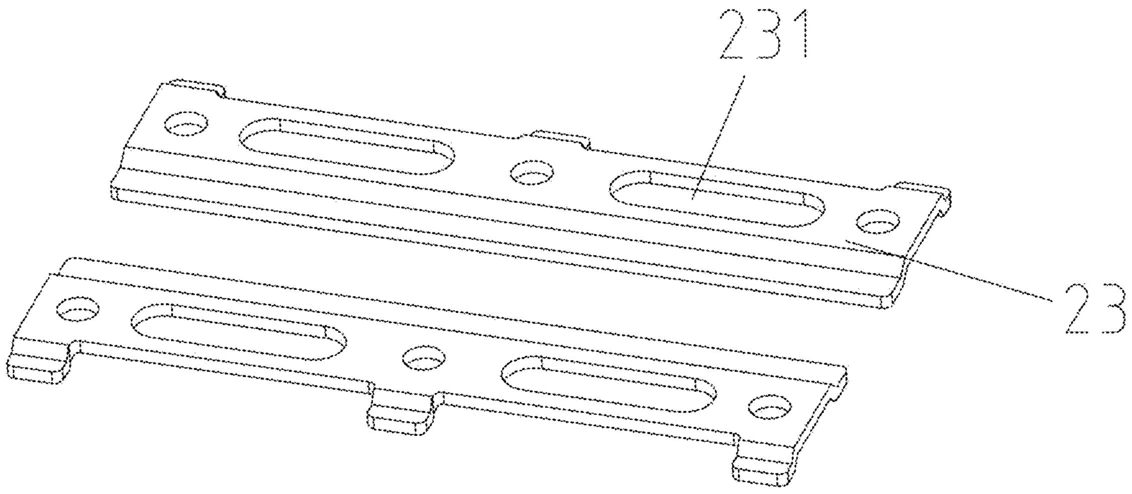
FIG. 9 is a schematic structural diagram of a movable blade in an electric hair clipper.

With reference to FIG. 4, FIG. 5, and FIG. 7 together, in this implementation, a first limiting slot 331 is provided in one end of the pressure lever 33. The first eccentric part 321 is accommodated in the first limiting slot 331. The first eccentric part 321 is connected to the pressure lever 33 through the first limiting slot 331. Another end of the pressure lever 33 is slidably connected to the bracket 20.

The first eccentric part 321 is in cooperative connection to the pressure lever 33 through the first limiting slot 331. Since the transmission member 32 rotates to drive the first eccentric part 321 to move, the first eccentric part 321 drives the entire pressure lever 33 to do the linear reciprocating motion through the first limiting slot 331. The end of the pressure lever 33 facing away from the first limiting slot 331 is slidably connected to the bracket 20, thereby playing a guiding role.

With reference to FIG. 4, FIG. 5, and FIG. 7 together, the pressure lever 33 is provided with a threaded part 332, and the threaded part 332 is located in the middle part of the pressure lever 33. The entire threaded part 332 is a part of a continuous thread and faces one side of the fixed blade 21 and one side of the movable blade 23. In this way, the pressure lever 33 can better limit the hairs through the threaded part 332. With the reciprocating motion of the pressure lever 33, the split ends of the hairs are pressed between the fixed blade 21 and the movable blade 23, so as to clip the split ends of the hairs. If the threaded part 332 is set as one part of the continuous thread, a volume occupied by the pressure lever 33 is small, which can make the structure more compact, reduce the overall volume of the electric hair clipper, and facilitate carrying. Moreover, one side of the threaded part 332 facing away from the fixed blade 21 and the movable blade 23 is of a hollow structure, which can reduce the overall weight and is lighter and more portable, thereby avoiding the burden on a user during carrying.

In some embodiments, with reference to FIG. 4, FIG. 5, and FIG. 7 together, the pressure lever 33 is arranged on the bracket 20 through a limiting plate 34. The limiting plate 34 is configured to limit movement of the pressure lever 33 in a direction perpendicular to a reciprocating motion direction of the pressure lever 33. The limiting plate 34 is fixedly arranged on the bracket 20 through a fastener. The limiting plate 34 is roughly of a semicircular clamping hoop structure. The limiting plate 34 surrounds the pressure lever 33 from one side of the pressure lever 33 facing away from the bracket 20. The limiting plate 34 is fixedly connected to the bracket 20 through the fastener. In this way, the pressure lever 33 is limited to prevent the pressure lever 33 from moving in the direction perpendicular to the reciprocating linear movement direction of the pressure lever 33. However, that the first eccentric part 321 drives the pressure lever 33 to do the linear reciprocating motion through the first limiting slot 331 is not affected. The fastener may employ a fastening bolt, a fastening screw, or the like, which is not specifically limited.

With reference to FIG. 4, FIG. 5, FIG. 8, and FIG. 9 together, the movable blade holder 22 is provided with a second limiting slot 221. The second eccentric part 322 is accommodated in the second limiting slot 221. The second eccentric part 322 is connected to the movable blade holder 22 through the second limiting slot 221. The movable blade holder 22 is provided with a plurality of first limiting bosses 222. The movable blade 23 is provided with a plurality of first clamping slots 231. The first limiting bosses 222 are clamped with the first clamping slots 231.

The second eccentric part 322 is connected to the movable blade holder 22 through the second limiting slot 221. As the transmission member 32 rotates to drive the second eccentric part 322 to move, the second eccentric part 322 drives the entire movable blade holder 22 to do the linear reciprocating motion through the second limiting slot 221. The plurality of first limiting bosses 222 arranged on the movable blade holder 22 are in one-to-one correspondence to the plurality of first clamping slots 231 arranged on the movable blade 23, thereby mounting the movable blade 23 on the movable blade holder 22 for ease of mounting and removal.

Figure 10:
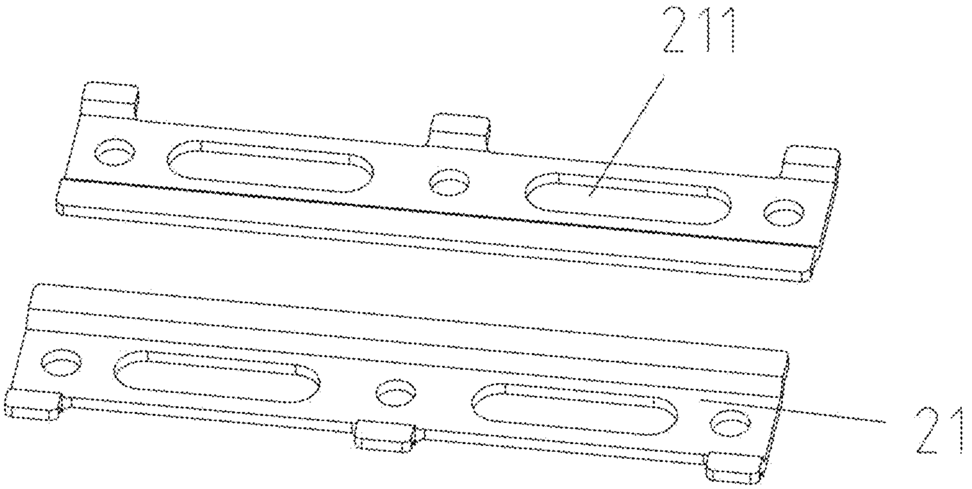
FIG. 10 is a schematic structural diagram of a fixed blade in an electric hair clipper.
Figure 11:
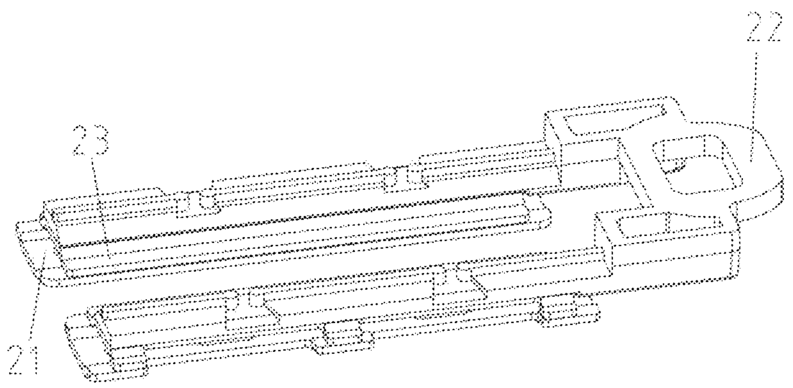
FIG. 11 is a schematic structural diagram of cooperation between a movable blade and a fixed blade in an electric hair clipper.

With reference to FIG. 4, FIG. 5, and FIG. 10 together, the bracket 20 is provided with a plurality of second limiting bosses 201. The fixed blade 21 is provided with a plurality of second clamping slots 211. The second limiting bosses 201 are clamped with the second clamping slots 211.

The plurality of second limiting bosses 201 arranged on the bracket 20 are in one-to-one correspondence to the plurality of second clamping slots 211 arranged on the fixed blade 21. By the clamping between the second limiting bosses 201 and the second clamping slots 211, the fixed blade 21 is mounted on the bracket 20 for ease of mounting and replacement of the fixed blade 21.

With reference to FIG. 4, FIG. 5, FIG. 8, FIG. 10, and FIG. 11 together, the first limiting bosses 222 are provided with accommodating slots 2221. The accommodating slots 2221 are in one-to-one correspondence to the second limiting bosses 201. The second limiting bosses 201 can accommodate the accommodating slots 2221, to facilitate the movable blade holder 22 to do the linear reciprocating motion.

The second limiting bosses 201 are fixedly arranged on the bracket 20, and are at least partially accommodated in the accommodating slots 2221. When the movable blade holder 22 does the linear reciprocating motion, the second limiting bosses 201 do not affect the movement of the movable blade holder 22 and can play a limiting role, thereby ensuring that the movable blade holder 22 moves linearly.

With reference to FIG. 4, torsion springs 24 are arranged on two sides of the movable blade 23. The torsion springs 24 are arranged on the bracket 20. Two ends of the torsion springs 24 are connected to the movable blade 23. By the arrangement of the torsion springs 24 to apply a pressure to the movable blade 23, the fixed blade 21 and the movable blade 23 abut against each other, and a gap is provided between the fixed blade 21 and the movable blade 23.

With reference to FIG. 4 and FIG. 5 together, in the electric hair clipper provided in the present disclosure, the driving assembly further includes a power source 35 and a first gear 31. The power source 35 is configured to supply electrical energy to the driving motor 30. The power source 35 may be a rechargeable lithium battery. The first gear 31 is connected to an output shaft of the driving motor 30 and is meshed with the transmission member 32. Specifically, in this implementation, the first gear 31 is an external gear, the transmission member 32 is an internal gear. The transmission member 32 is a bevel gear. The driving motor 30 operates to drive the first gear 31 to rotate, and the first gear 31 drives the transmission member 32 to rotate through the meshing with the transmission member 32.

With reference to FIG. 1 to FIG. 5 together, the electric hair clipper provided in the present disclosure further includes an upper shell 10, an upper cover plate 11, a lower shell 40, and a lower cover plate 41. The upper shell 10 and the upper cover plate 11 are connected. The upper shell 10 and the upper cover plate 11 form an upper accommodating cavity. The cutting assembly and the driving assembly are arranged in the upper accommodating cavity. The lower shell 40 and the lower cover plate 41 are connected. The lower shell 40 and the lower cover plate 41 form a hair storage bin 42. The hair storage bin 42 is configured to store fallen hairs cut off by the fixed blade 21 and the movable blade 23. The lower cover shell 41 is provided with a bin cover 43. The bin cover 43 is detachably connected to the lower cover plate 41. The upper shell 10 and the lower shell 40 are rotatably connected. An elastic member 50 is arranged between the upper shell 10 and the lower shell 40.

The upper shell 10 and the upper cover plate 11 are configured as an upper half part of the electric hair clipper, while the lower shell 40 and the lower cover plate 41 are configured as a lower half part of the electric hair clipper. The upper shell 10 and the lower shell 40 are hinged, so that the entire electric hair clipper is roughly formed into a "V"-shaped opening structure, which not only maximizes the hair feeding amount, but also facilitates a handheld operation. The elastic member 50 is arranged close to a hinged position between the upper shell 10 and the lower shell 40. The elastic member 50 may employ a spring. The elastic member 50 can play a supporting role to drive the upper shell 10 and the lower shell 40 to be opened and maintained. During operation, only an elastic force of the elastic member 50 needs to be overcome to make the upper shell 10 abut against the lower shell 40. After the hair clipping work is completed and the upper shell 10 and the lower shell 40 are released, the upper shell 10 and the lower shell 40 are automatically reset, making the operation convenient. The fallen hairs cut off by the fixed blade 21 and the movable blade 23 fall into the hair storage bin 42 formed by the lower shell 40 and the lower cover plate 41. After use for a period of time, the bin cover 43 is opened to pour out the cut hairs from the hair storage bin 42, and the hair storage bin 42 is cleaned with a brush.

Figure 12:
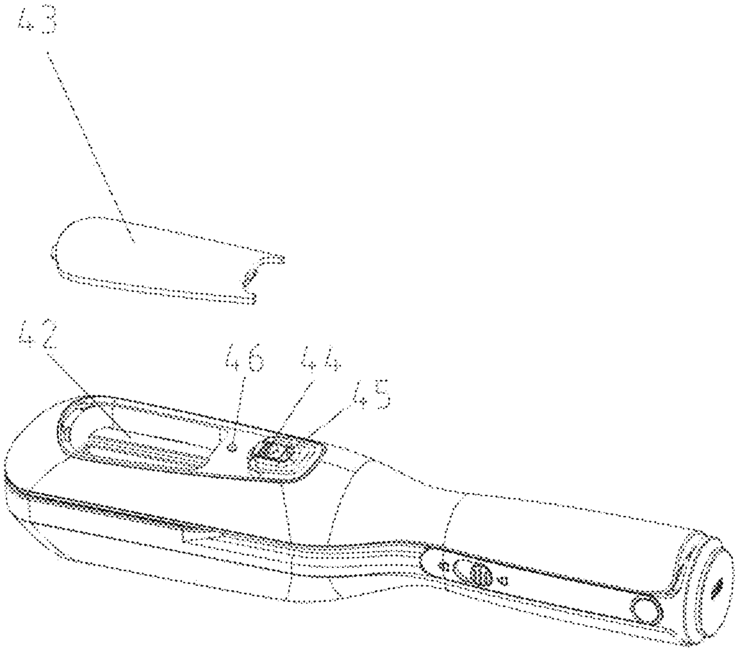
FIG. 12 is a schematic exploded view I of a bin cover part in an electric hair clipper.
Figure 13:
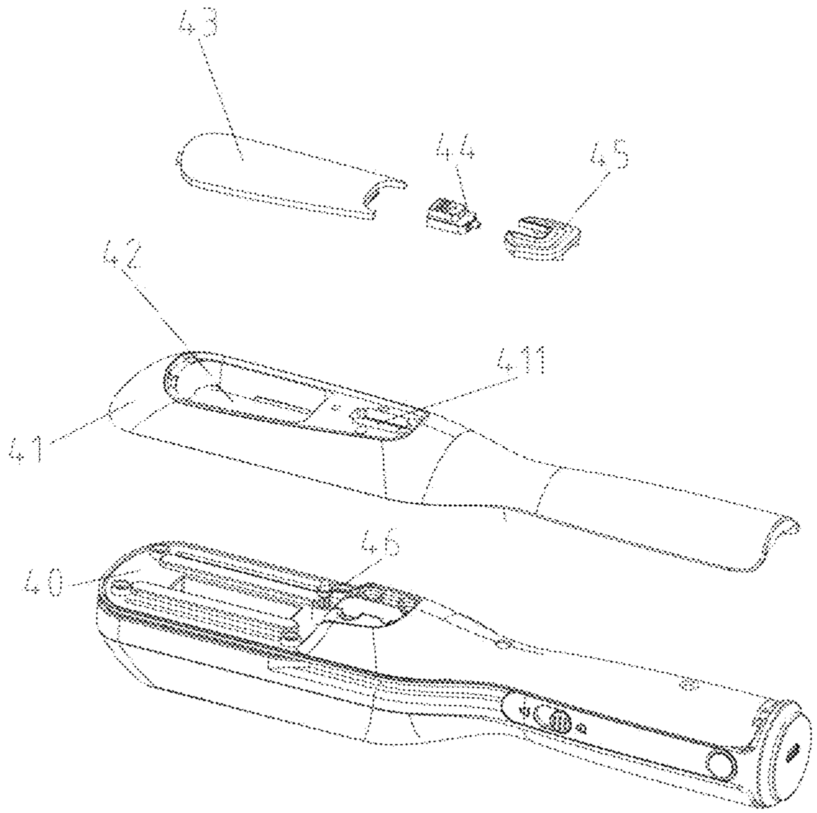
FIG. 13 is a schematic exploded view II of a bin cover part in an electric hair clipper.

With reference to FIG. 4, FIG. 12, and FIG. 13 together, in the electric hair clipper provided in the present disclosure, the lower cover plate 41 is further provided with a sliding member 44 and a fixing member 45. The lower cover plate 41 is provided with a limiting sliding chute 411. The fixing member 45 is fixedly arranged on the lower cover plate 41. The sliding member 44 is movably arranged on the limiting sliding chute 411. One end of the sliding member 44 is connected to the lower cover plate 41 through a spring (not shown). One side of the bin cover 43 is used for being in clamping connection with the lower cover plate 41. Another side of the bin cover 43 is used for pressing against one end of the sliding member 44 facing away from the spring.

The fixing member 45 is roughly of a U-shaped structure and is in clamping connection with the lower cover plate 41. One end of the sliding member 44 is connected to the spring. The sliding member 44 can be pushed to move along the limiting sliding chute 411. When the bin cover 43 is mounted on the lower cover plate 41, the sliding member 44 is pushed, and the spring is compressed. The sliding member 44 slides along the limiting sliding chute 411, so that one side of the bin cover 43 is clamped with the lower cover plate 41. After the bin cover 43 is mounted in place, the sliding member 44 is released. Under the action of the spring, the sliding member 44 is reset. The end of the sliding member 44 facing away from the spring presses against the bin cover 43, thus completing the mounting of the bin cover 43. Similarly, when the bin cover 43 is removed from the lower cover plate 41, the sliding member 44 is pushed to slide along the limiting sliding chute 411. The sliding member 44 does not press against the bin cover 43. In this case, the bin cover 43 can be easily removed.

In some embodiments, the lower cover plate 41 is further provided with an elastic contact point 46. When the bin cover 43 is mounted on the lower cover plate 41, the elastic contact point 46 is pressed. When the bin cover 43 is removed, as the sliding member 44 is pushed, the sliding member 44 slides along the limiting sliding chute 411, and the sliding member 44 does not press against the bin cover 43. In this case, the bin cover 43 pops up under the resetting action of the elastic contact point 46. In this way, it is convenient to remove the bin cover 43 from the lower cover plate 41, and the operation is simple.

Figure 2:
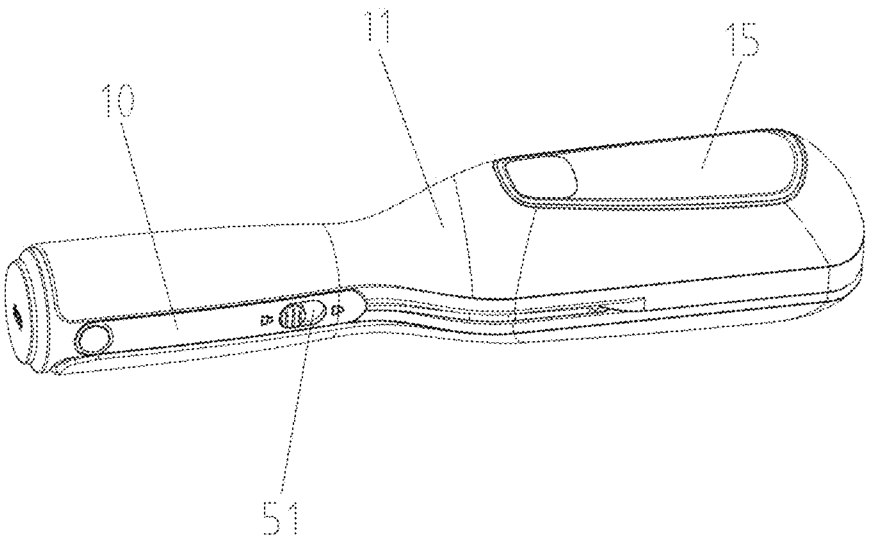
FIG. 2 is a schematic structural diagram of an electric hair clipper in another viewing angle according to an embodiment of the present disclosure.

With reference to FIG. 1 and FIG. 2 together, in the electric hair clipper provided in the present disclosure, the upper shell 10 is provided with a switch 12 for starting or stopping the electric hair clipper.

With reference to FIG. 1, FIG. 4, and FIG. 5 together, the electric hair clipper provided in the present disclosure further includes a circuit board 13 and a battery level display 14. The circuit board 13 and the battery level display 14 are located in the upper accommodating cavity formed by the upper shell 10 and the upper cover plate 11. The circuit board 13 is electrically connected to the power source 35 and the battery level display 14. A battery level is displayed through the battery level display 14 to remind a user of the battery level. The upper cover plate 11 is provided with a battery level cover plate 15. The battery level cover plate 15 is detachably connected to the upper cover plate 11, for example, in a buckling connection or snap-fit connection manner. An observation hole is provided in a position of the battery level cover plate 15 corresponding to the battery level display 14 for ease of observation of the battery level.

Figure 3:
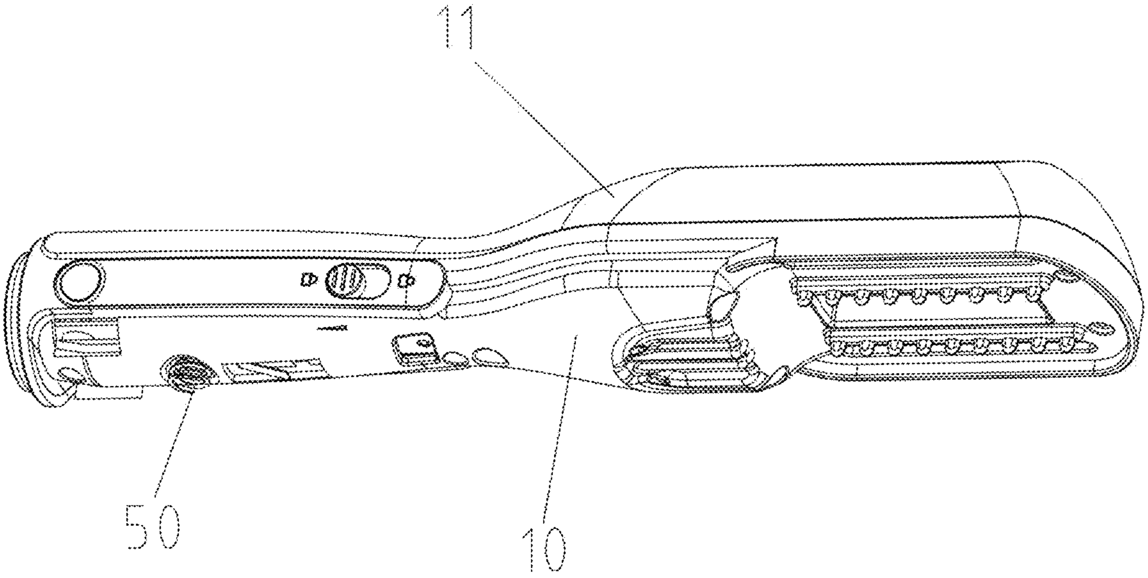
FIG. 3 is a schematic partially structural diagram of an electric hair clipper according to an embodiment of the present disclosure.

With reference to FIG. 2 and FIG. 3 together, the electric hair clipper provided in the present disclosure further includes a locking push button 51. During use, the locking push button 51 is opened, and the upper shell 10 and the lower shell 40 are in an unlocked state. The upper shell 10 and the lower shell 40 can rotate to an extent. After use, the locking push button 51 is closed, and the upper shell 10 and the lower shell 40 are in a locked state. The upper shell 10 and lower shell 40 cannot rotate.

In some embodiments, with reference to FIG. 4 and FIG. 5 together, the electric hair clipper provided in the present disclosure is further provided with a negative-ion generator 60. The negative-ion generator 60 generates negative ions to help eliminate static electricity from the hairs, making the hairs softer and smoother, reducing frizzy hairs and split ends, and making the hairs combed more easily.

According to the electric hair clipper provided in the present disclosure, the first eccentric part 321 and the second eccentric part 322 are eccentrically arranged relative to the transmission member 32. As the driving motor 30 drives the transmission member 32 to rotate, the first eccentric part 321 drives the pressure lever 33 to do the linear reciprocating motion. Meanwhile, the second eccentric part 322 drives the movable blade holder 22 to do the linear reciprocating motion. As the pressure lever 33 does the linear reciprocating motion, the pressure lever 33 presses the hairs between the fixed blade 21 and the movable blade 23. As the movable blade holder 22 does the linear reciprocating motion, the movable blade holder 22 drives the movable blade 23 to do the linear reciprocating motion. The movable blade 23 and the fixed blade 21 cooperate to clip the hairs, thereby cutting off split ends of the hairs. The electric hair clipper has a good clipping effect, is convenient to use, and is compact in overall structure, smaller in volume, and convenient to carry.

It should be noted that in this specification, relationship terms such as first and second are only used to distinguish one entity from several other entities, and do not necessarily require or imply any actual relationship or order between these entities.

The principles and implementations of the present disclosure are explained herein with specific examples, and the explanations of the above embodiments are only used to help understand the method of the present disclosure and a core idea of the method. It should be pointed out that a person of ordinary skill in the art can also make several improvements and modifications to the present disclosure without departing from the principles of the present disclosure, and these improvements and modifications also fall within the scope of protection of the claims of the present disclosure.

What is claimed is:

1. An electric hair clipper, comprising:

a cutting assembly, wherein the cutting assembly comprises a bracket and a movable blade holder; the movable blade holder is movably arranged on the bracket; the bracket is fixedly provided with a fixed blade; the movable blade holder is fixedly provided with a movable blade; and a driving assembly, wherein the driving assembly comprises a driving motor, a transmission member, and a pressure lever; the driving motor is in transmission connection to the transmission member; the transmission member is fixedly provided with a first eccentric part and a second eccentric part; the pressure lever is movably arranged on the bracket;

when the driving motor drives the transmission member to rotate, the first eccentric part drives the pressure lever to do linear reciprocating motion to press hairs between the fixed blade and the movable blade; and the second eccentric part drives the movable blade holder to do linear reciprocating motion to drive the movable blade to move for clipping.

2. The electric hair clipper according to claim 1, wherein the transmission member is a gear; the second eccentric part is fixedly arranged on the transmission member; the first eccentric part is fixedly arranged on the second eccentric part; and the first eccentric part is located on one side of the second eccentric part facing away from the transmission member.

3. The electric hair clipper according to claim 2, wherein a first limiting slot is provided in one end of the pressure lever; the first eccentric part is accommodated in the first limiting slot; the first eccentric part is connected to the pressure lever through the first limiting slot; and another end of the pressure lever is slidably connected to the bracket.

4. The electric hair clipper according to claim 3, wherein the movable blade holder is provided with a second limiting slot; the second eccentric part is accommodated in the second limiting slot; and the second eccentric part is connected to the movable blade holder through the second limiting slot.

5. The electric hair clipper according to claim 4, wherein the movable blade holder is provided with a first limiting boss; the movable blade is provided with a first clamping slot; and the first limiting boss is clamped with the first clamping slot.

6. The electric hair clipper according to claim 5, wherein the bracket is provided with a second limiting boss; the fixed blade is provided with a second clamping slot; and the second limiting boss is clamped with the second clamping slot.

7. The electric hair clipper according to claim 6, wherein the first limiting boss is provided with an accommodating slot; and the second limiting boss is accommodated inside the accommodating slot, so that the movable blade holder does the linear reciprocating motion.

8. The electric hair clipper according to claim 1, wherein the pressure lever is provided with a threaded part; and the threaded part is located in a middle part of the pressure lever.

9. The electric hair clipper according to claim 8, wherein torsion springs are arranged on two sides of the movable blade; the torsion springs are arranged on the bracket; and two ends of the torsion springs are connected to the movable blade.

10. The electric hair clipper according to claim 9, wherein the pressure lever is arranged on the bracket through a limiting plate; the limiting plate is configured to limit movement of the pressure lever in a direction perpendicular to a reciprocating motion direction of the pressure lever; and the limiting plate is fixedly arranged on the bracket through a fastener.

11. The electric hair clipper according to claim 10, wherein the driving assembly further comprises:

a power source, configured to supply electrical energy to the driving motor; and a first gear, connected to an output shaft of the driving motor and is meshed with the transmission member.

12. The electric hair clipper according to claim 11, further comprising:

an upper shell and an upper cover plate, wherein the upper shell and the upper cover plate are connected; the upper shell and the upper cover plate form an upper accommodating cavity; the cutting assembly and the driving assembly are arranged in the upper accommodating cavity; and a lower shell and a lower cover plate, wherein the lower shell and the lower cover plate are connected; the lower shell and the lower cover plate form a hair storage bin; the hair storage bin is configured to store fallen hairs cut off by the fixed blade and the movable blade;

the upper shell and the lower shell are rotatably connected; and an elastic member is arranged between the upper shell and the lower shell.

13. The electric hair clipper according to claim 12, further comprising a circuit board and a battery level display, wherein the circuit board and the battery level display are located in the upper accommodating cavity formed by the upper shell and the upper cover plate; and the circuit board is electrically connected to the power source and the battery level display.

14. The electric hair clipper according to claim 13, wherein the lower cover plate is further provided with a bin cover, a sliding member, and a fixing member; the lower cover plate is provided with a limiting sliding chute; the fixing member is fixedly arranged on the lower cover plate; the sliding member is movably arranged on the limiting sliding chute; one end of the sliding member is connected to the lower cover plate through a spring; one side of the bin cover is used for being in clamping connection with the lower cover plate; and another side of the bin cover is used for pressing against one end of the sliding member facing away from the spring.

* * * * *